Figure 4:
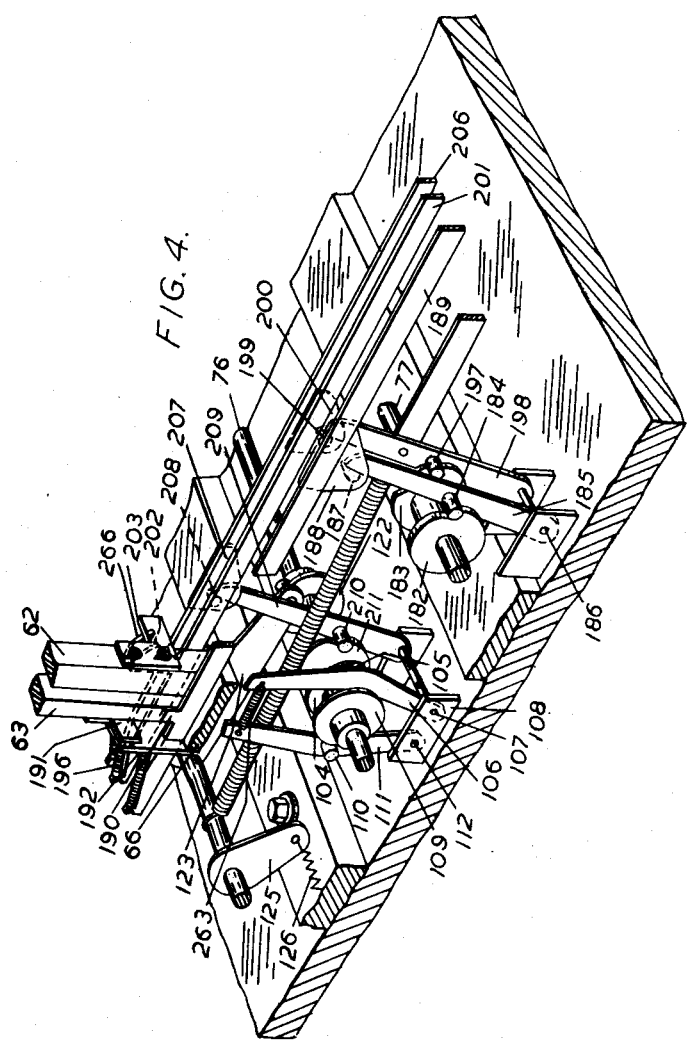

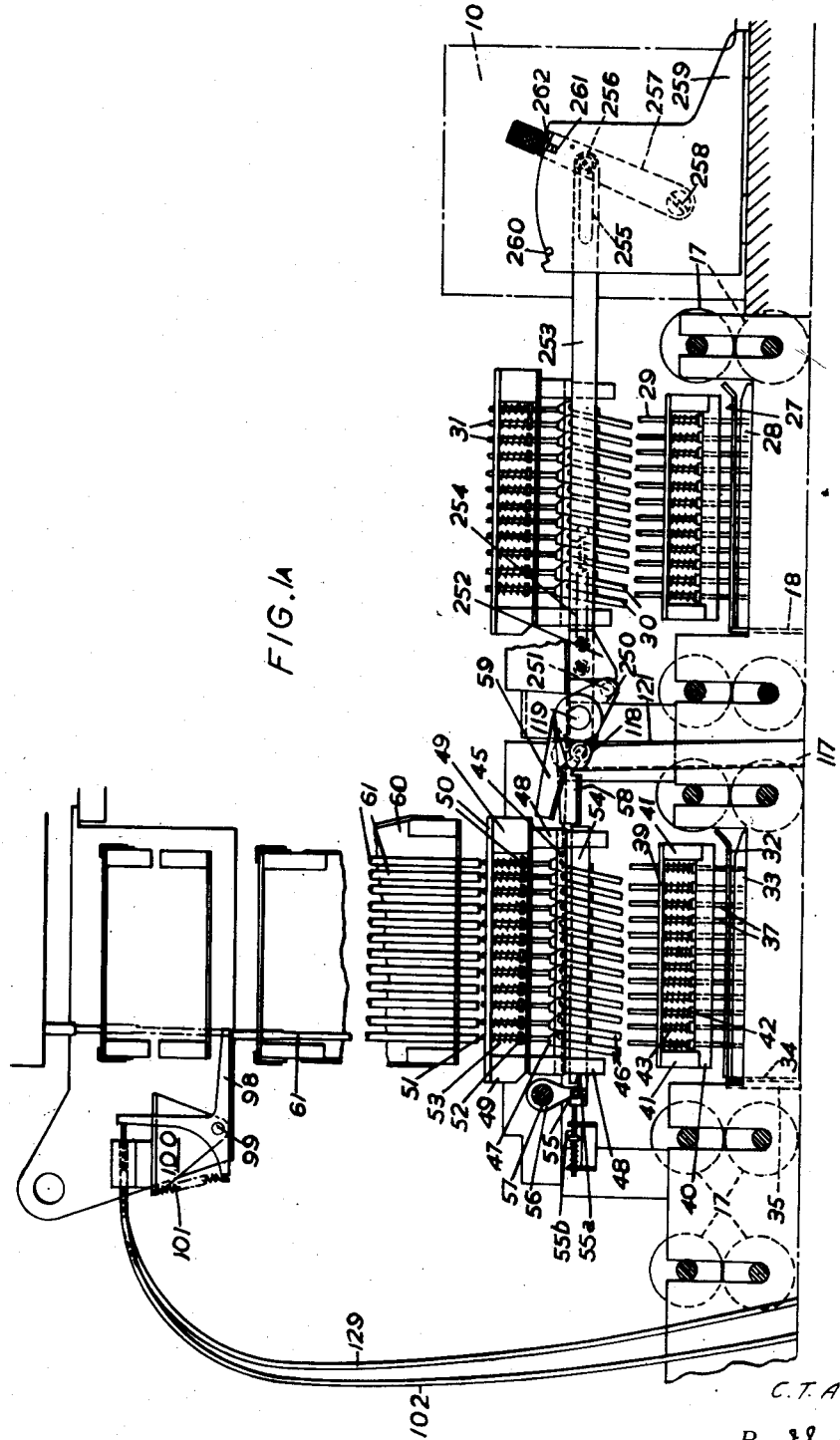

May 12, 1953 C. T. A. JONES 2,638,270
MECHANISM FOR SENSING STATISTICAL RECORD CARDS
Filed Nov. 7, 1950 9 Sheets-Sheet 2
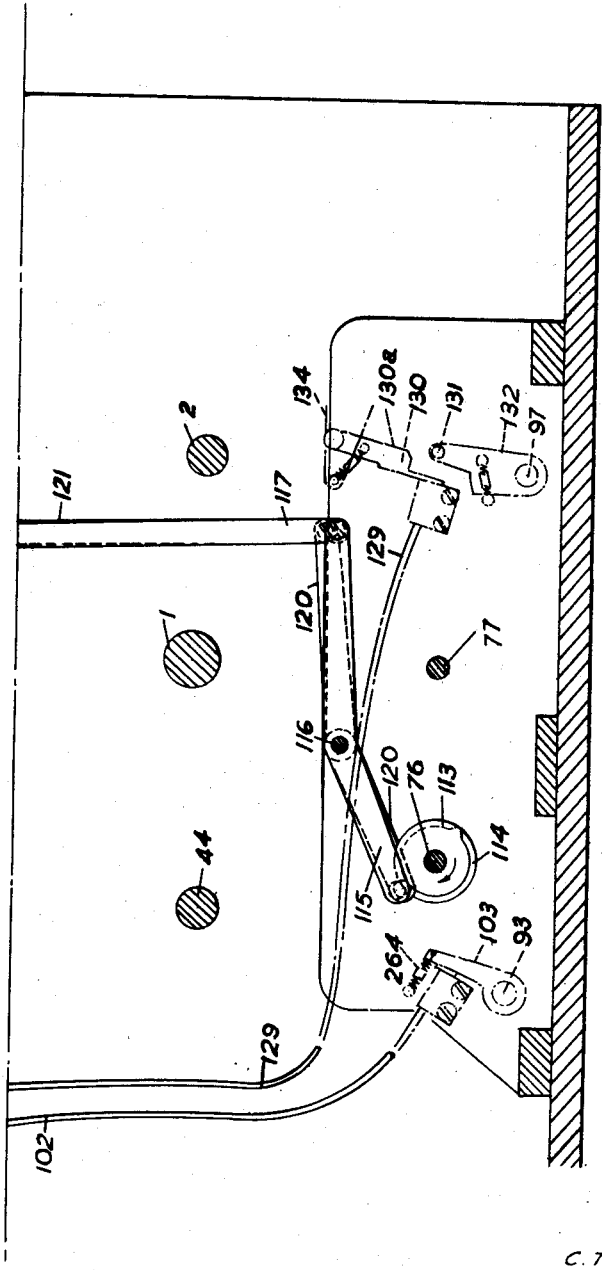
Inventor
C. T. A. JONES
By J. L. Sterling
Attorney

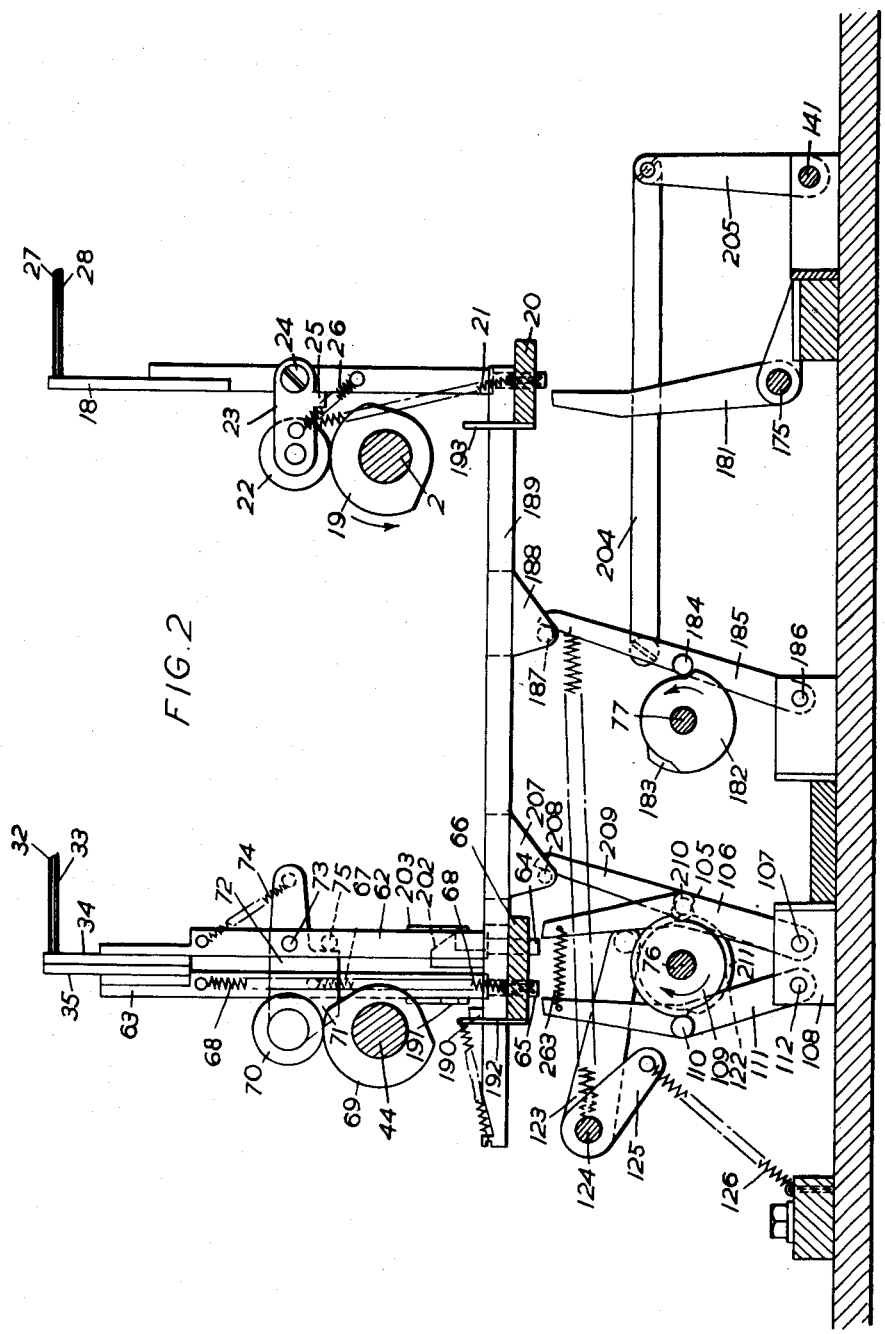

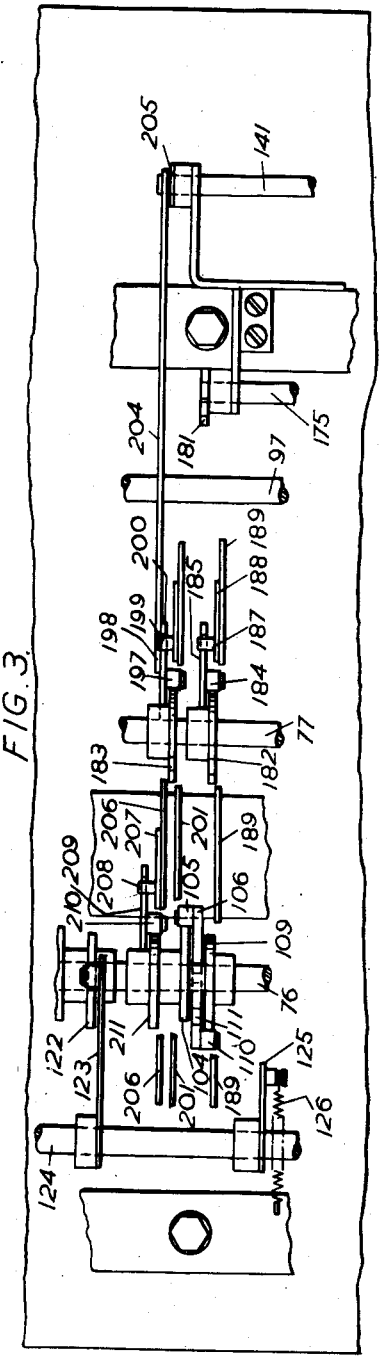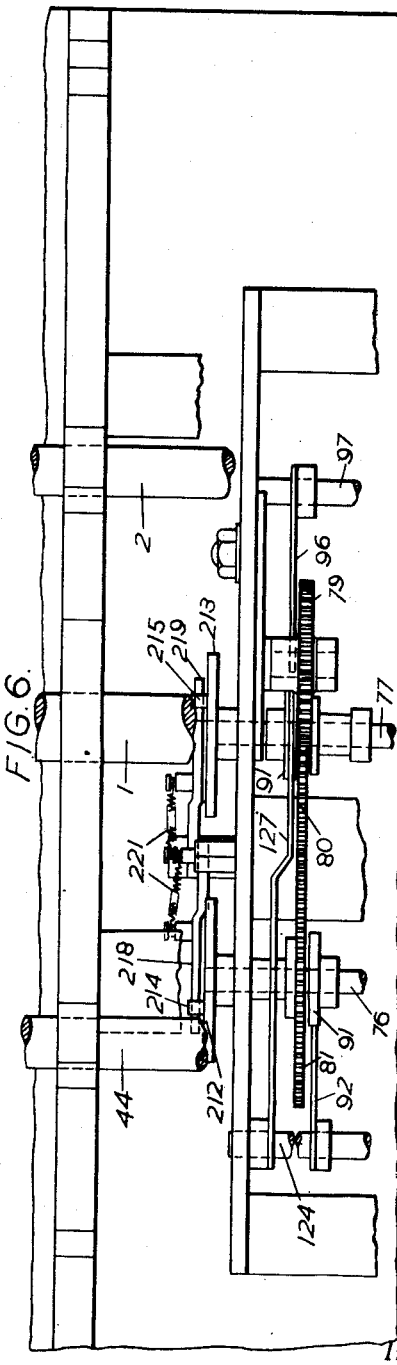

May 12, 1953 C. T. A. JONES 2,638,270
MECHANISM FOR SENSING STATISTICAL RECORD CARDS
Filed Nov. 7, 1950 9 Sheets-Sheet 5

Inventor
C.T.A. JONES
By J. L. Sterling
Attorney

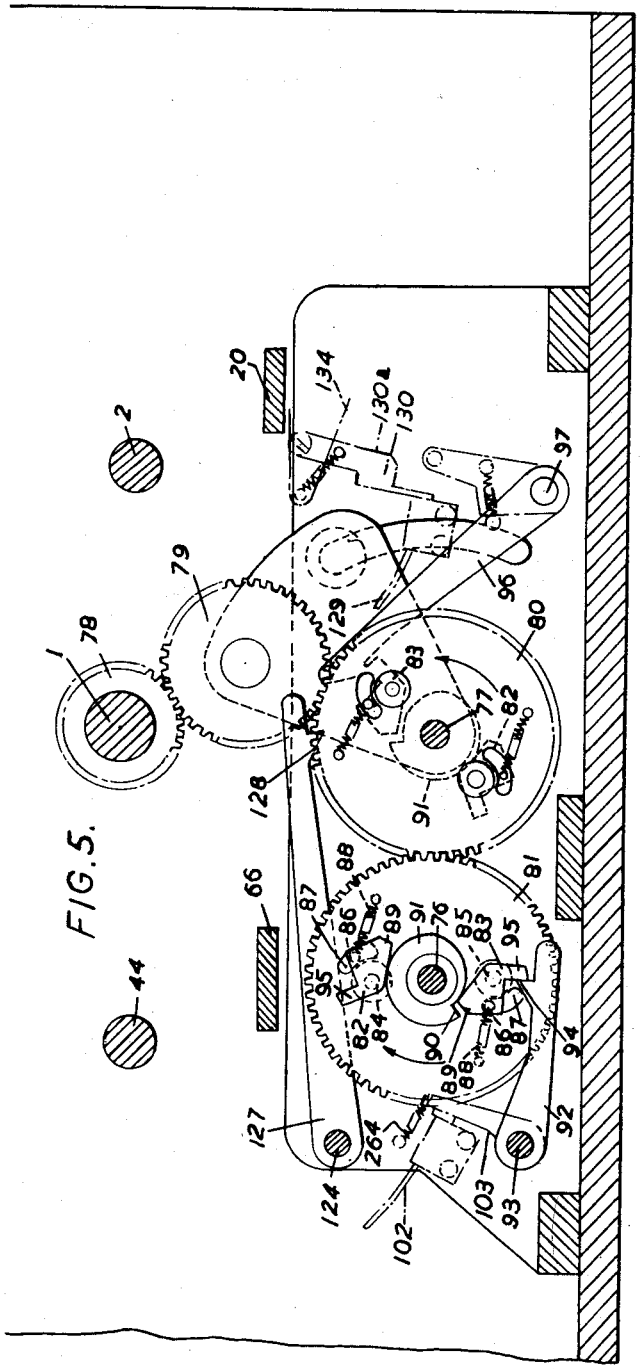

May 12, 1953     C. T. A. JONES     2,638,270
MECHANISM FOR SENSING STATISTICAL RECORD CARDS
Filed Nov. 7, 1950     9 Sheets-Sheet 7

Inventor
C.T.A. JONES
By J.L. Sterling
Attorney

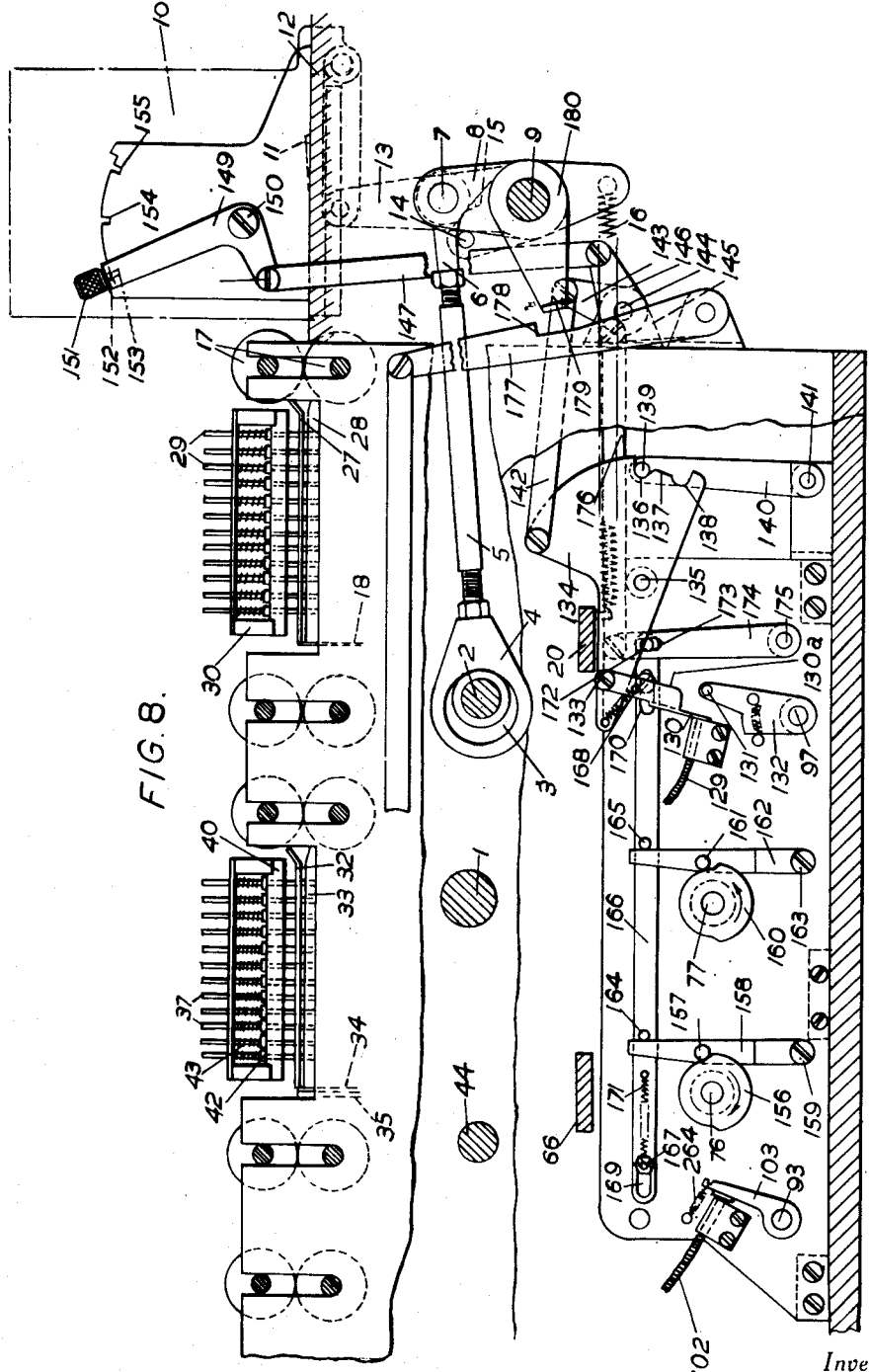

May 12, 1953　　　C. T. A. JONES　　　2,638,270
MECHANISM FOR SENSING STATISTICAL RECORD CARDS
Filed Nov. 7, 1950　　　9 Sheets-Sheet 9

Inventor
C.T.A. JONES
By J&L Sterling
Attorney

Patented May 12, 1953

2,638,270

UNITED STATES PATENT OFFICE 2,638,270

MECHANISM FOR SENSING STATISTICAL RECORD CARDS

Charles Thomas Arthur Jones, Wallington, England, assignor to Powers-Samas Accounting Machines Limited, London, England, a British company Application November 7, 1950, Serial No. 194,463
In Great Britain November 8, 1949

20 Claims. (Cl. 235—61.11)

This invention relates to mechanism for sensing statistical record cards.

It is already well known in the art to double the data bearing capacity of a record card by utilising as a second set of data indicating positions the spaces between the horizontal rows of normal data indicating positions. Such data indicating positions have come to be known as "normal" and "interstage" positions and will be referred to herein in these terms.

Cards for use in mechanism according to the present invention may in some instances have two or more sets of data punched in each of two or more normal fields, or in each of two or more interstage fields, or otherwise, as will hereinafter be described.

In United Kingdom specification No. 473,757, it has been proposed to provide means for sensing two fields of a record card consecutively, one field being sensed at one sensing operation and the other field being sensed at the next following sensing operation.

Further, in United States Patent No. 2,290,827 it has been proposed to sense cards punched in two fields both in normal and interstage positions and there is disclosed therein a sensing mechanism having associated therewith two card stops one locating a card in position for normal sensing and the other for locating the card in position for interstage sensing. As described in this prior specification the card stops are operated alternately for each card fed to the sensing position so that each card is retained first in normal sensing position for two successive sensing cycles and then in interstage sensing position for two successive sensing cycles.

It is sometimes desired that the record cards fed to a statistical machine be so fed that some cards require sensing only in normal fields while others may require sensing in a normal field and also in an interstage field, and it is an object of the present invention to provide means whereby mixed cards can be fed successively into the machine conditioned automatically to determine the number of sensing cycles during which each card is located in a position for sensing.

According to the invention there is provided a statistical machine comprising in combination record card sensing means, card engaging elements respectively to locate a record card relative to said sensing means in positions at which during different sensing cycles normal or interstage data representations on a card can be sensed, and settable means operable under control from the sensing means to determine the sensing cycles during which a card engaging element is rendered effective to locate a card in sensing position.

It is a further object of the invention to provide in combination with mechanism mentioned above means whereby one or more normal or interstage fields of a record card can be sensed in successive sensing cycles.

Accordingly the invention also includes selectively operable devices actuated under control from the sensing means to render predetermined sections of the sensing means effective during a sensing operation.

Further, a statistical machine according to the invention may include selector means to condition said settable means for operation.

In one embodiment of the invention the sensing means is driven from the main shaft of the machine and the aforesaid settable means comprises a control shaft, a clutch device to couple the control shaft to the main shaft, reduction gearing to transmit rotary motion from the main shaft to the control shaft so that the control shaft is rotated once for a predetermined number of rotations of the main shaft, a trip device to render the clutch device effective to couple the control shaft to the main shaft, said trip device being arranged for actuation by an impulse emitted from the sensing means when a predetermined control indication is detected in a card being sensed, cams on the control shaft, and latching means operable by said cams to control the card engaging elements.

In a further embodiment of the invention the sensing means is driven from the main shaft of the machine and the settable means comprises a first control shaft and a second control shaft, a clutch device for each control shaft whereby the control shafts can be independently coupled to the main shaft, reduction gearing to transmit rotary motion from the main shaft to the control shafts so that the control shafts are rotated once for a predetermined number of rotations of the main shaft, a first trip device to render the clutch device for the first control shaft effective to couple the first control shaft to the main shaft, a second trip device to render the clutch device for the second control shaft effective to couple the second control shaft to the main shaft, said trip devices being arranged for actuation by impulses emitted from the sensing means when predetermined control indicia are detected in a card being sensed, cams on the first and second control shafts, and latching means operable by said cams to control the card engaging elements.

A machine according to the invention can be conditioned to sense cards fed from a pack containing:

(a) Only cards having data punched in normal data indicating positions all such data to be sensed during one sensing operation.

(b) Only cards having data punched in interstage data positions all such data to be sensed during one sensing operation.

(c) Only cards having data punched in normal data positions the data being contained in two fields to be sensed separately in successive sensing operations.

(d) Only cards having data punched in interstage data positions the data being contained in two fields to be sensed separately in successive sensing operations.

(e) Cards having data punched in normal and interstage data positions the normal or interstage data cycles being sensed in one sensing operation and when a card contains both normal and interstage data the normal data is sensed in a first sensing cycle and the interstage data in the next succeeding sensing cycle. Some of the cards of a pack may have normal interstage data and the machine will determine automatically whether a particular card is to be retained in sensing position for one or more sensing operations.

(f) Some cards having data punched in normal and interstage data positions some cards having only normal data to be sensed either in one or two stages some cards having a single field of normal data and one or two fields of interstage data and some cards having both normal data in two separate fields and interstage data also in two separate fields. Alternatively the pack may consist entirely of cards having only one of such forms of data punched therein.

In order that the invention may be more clearly understood one embodiment thereof will be described with reference to the accompanying diagrammatic drawings, in which, Figures 1A and 1B together illustrate record card sensing means with some of the control mechanism according to the invention applied thereto and having in combination therewith a pre-sensing mechanism, Figure 2 illustrates the mechanism for operating card stops associated with the sensing mechanism and the pre-sensing mechanism.

Figure 7:
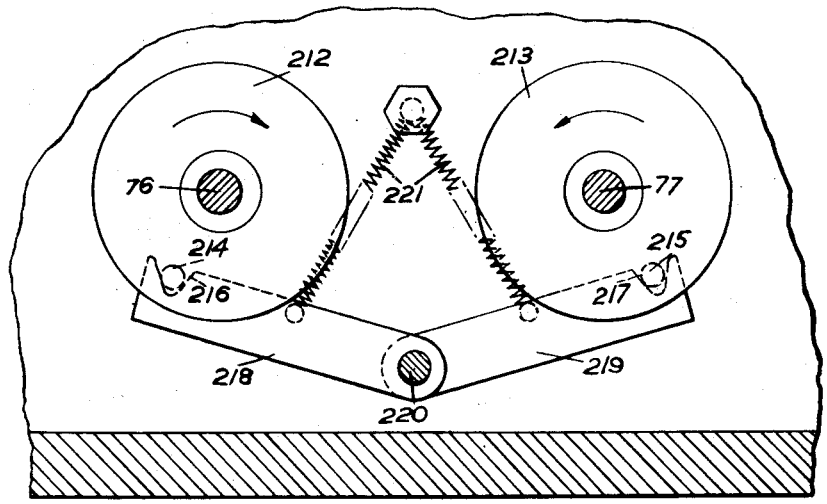
Figure 10:
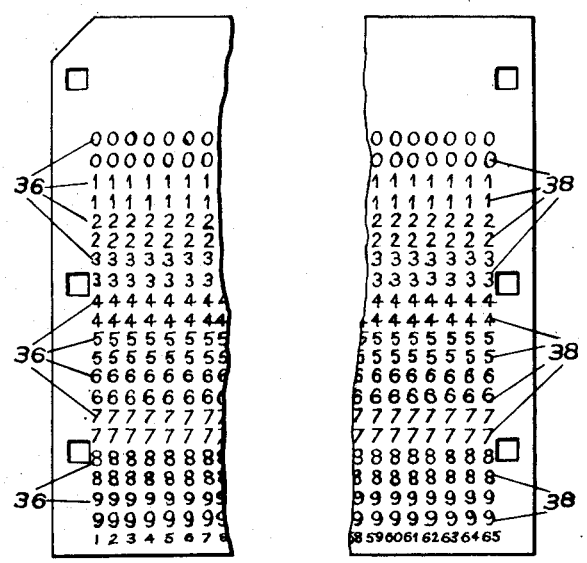
Figure 9:
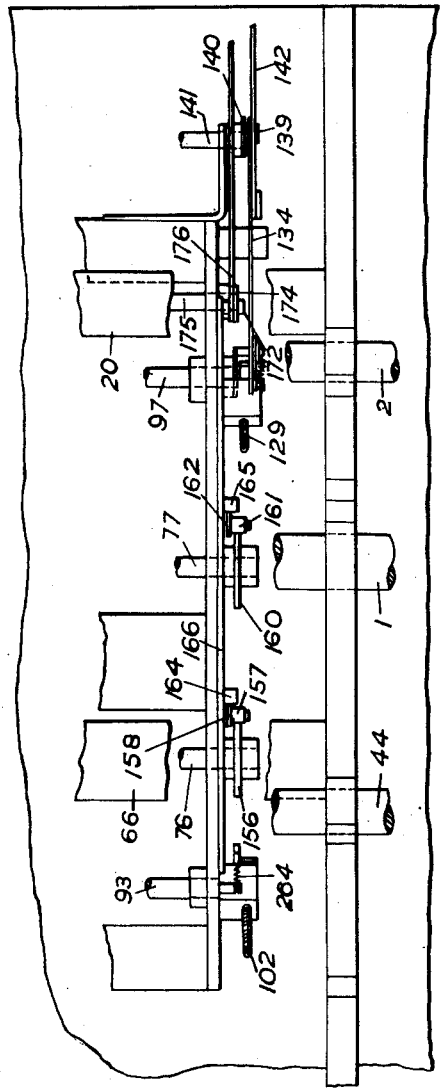

Figure 3 is a plan of the mechanism located below the card stops shown in Figure 2, Figure 4 is a perspective view of latching devices associated with the stops, Figure 5 illustrates mechanism for operating certain of the card stops shown in Figure 2, Figure 6 is a plan of the mechanism shown in Figure 5, Figure 7 is an elevation showing a detail of the mechanism illustrated in Figure 6, this detail having been omitted from Figure 6 for the sake of clarity, Figure 8 illustrates mechanism for controlling the feeding of cards to the sensing means, Figure 9 is a plan of a portion of the mechanism shown in Figure 8, and Figure 10 illustrates a record card having normal and interstage data indicating positions.

In the drawings the invention is shown applied to a tabulating machine the main shaft 1 of which is driven by any suitable means, such as an electric motor, not shown. The shaft 1, through gearing not shown, drives a first pin box shaft 2 on which is mounted an eccentric 3, Figure 8, carrying an eccentric strap 4 having secured thereto a connecting bar 5 the opposite end of which is secured to a knuckle 6 mounted on a pin 7 carried by a lever 8 freely mounted on a magazine drive shaft 9.

Perforated record cards to be fed into the machine are contained in a magazine 10 and record cards are removed one at a time from the bottom of the pack in the magazine by a picker 11 mounted for oscillation beneath the magazine in well-known manner. The picker 11 is carried by a slide 12 reciprocation of which is effected by an arm 13 secured to the magazine drive shaft 9. As stated above the lever 8 is freely mounted on the shaft 9 and reciprocation of the slide 12 is effected by the engagement of the lever 8 with a pin 14 extending laterally from an arm 15 secured to the shaft 9. A spring 16 acts to return the shaft 9 and slide 12 to the starting position. Thus, when the eccentric 3 operates to effect a feeding operation the lever 8 engages with the pin 14, rocks the shaft 9 and arm 13 thereby moving the slide 12 and picker 11 in a forward direction, that is in a direction to the left as viewed in Figure 8. As indicated in Figure 8 the slide is at the end of its forward stroke.

A card moved out of the magazine by the picker 11 is received by a pair of feed rollers 17 and is delivered thereby into a first or pre-sensing mechanism in which the card is sensed for control holes which control the subsequent operation of certain parts of the tabulator as is well-known in the art. The card fed by the feed rollers 17 is located in pre-sensing position by a pre-sensing card stop 18 movement of which is controlled by a cam 19, Figure 2, mounted on the shaft 2. The card stop 18 is guided for movement in a vertical plane by having its lower end passing through a slot in a fixed bar 20 and a spring 21 is arranged to draw the pre-sensing card stop downwards to its inactive or non-card arresting position. The cam 19 co-operates with a roller 22 carried by an arm 23 pivoted at 24 to the stem of the card stop 18. The arm 23 is provided with an abutment 25 which is drawn into engagement with the stem of the card stop by a spring 26. It is not always required that the picker 11 and card stop 18 be operated at each cycle of the main shaft 1 and mechanism hereinafter to be described is provided to render these parts ineffective when it is desired that during one or more cycles of the main shaft they shall be made ineffective.

The card engaged by the pre-sensing card stop 18 is located in a pre-sensing chamber formed by upper and lower plates 27, 28 in known manner and sensing pins indicated diagrammatically at 29, Figure 1A, are contained in a pin box supported for vertical reciprocation by known mechanism not shown, the pin box being actuated from the shaft 2.

The pin box is constructed in a manner similar to that described in United Kingdom specification No. 401,012 and comprises a lower reciprocating portion housing the sensing pins 29 and an upper fixed portion containing intermediate elements 30 and transmission rods 31 similar to the corresponding parts described in the aforesaid United Kingdom specification No. 401,012. The transmission rods are arranged to operate members, not shown, to control the subsequent functions of the machine.

After the record card has been sensed by the pre-sensing device the pre-sensing card stop 18 is lowered to permit the card to be fed out of the pre-sensing chamber by feed rollers which pass it to further feed rollers arranged to feed the card into a second sensing chamber comprising an upper perforated plate 32 and a lower perforated plate 33 the card being located in this sensing chamber by one of a pair of card engaging elements shown as card stops 34, 35. The card stop 34 is arranged to locate the card in a position such that normal data positions 36, Figure 10, can be sensed by sensing pins 37 of the sensing means to be briefly described below. The card stop 35 is arranged to arrest the card in a position such that interstage data representing holes 38, Figure 10, can be sensed by the sensing pins 37.

The sensing mechanism diagrammatically illustrated in Figure 1A comprises a pin box constructed in a manner similar to that described in the aforesaid United Kingdom specification No. 401,012 and includes a lower reciprocating portion carrying the sensing pins 37 and an upper fixed portion. The lower reciprocating portion of the pin box comprises upper and lower pin plates 39 and 40 connected at each end by transverse bars 41, the plates 39 and 40 being provided in the usual manner with holes for the reception of the sensing pins 37. Each sensing pin 37 has a collar 42 resting on the lower pin plate 40 and has a spring 43 tending to press the pin downwardly. The movable portion of the pin box is reciprocated in well-known manner by mechanism, not shown, the drive for the pin box being obtained from a shaft 44, Figure 1B, driven from the main shaft 1 by mechanism not shown.

In the manner described in United Kingdom specification No. 401,012 the upper fixed part of the pin box includes a plate 45 having holes through which pass intermediate elements 46 each having a head 47 by which the element is suspended from the plate 45. The plate 45 is suspended by two transverse bars 48, which are fixed to the frame of the machine.

Also secured to the transverse bars 48 are two fixed pin plates 50 spaced apart by two further transverse bars 49, the pin plates 50 having holes through which pass transmission rods 51 (corresponding to the rods 18 shown in United Kingdom specification No. 401,012). Each transmission rod 51 has a collar 52 and a spring 53 which pushes it downwards and the lower end of each rod 51 bears on the head 47 of the corresponding intermediate transmission element 46. As described in United Kingdom specification No. 401,012 each intermediate rod 51 is offset with respect to the intermediate transmission element 46 and the corresponding spring 53 tends to rock the transmission element 46 counter-clockwise about its head 47.

In United Kingdom specification No. 401,012 there is described a shutter 26 and in the present construction this shutter 26 is replaced by shutters 54 independent to each column of intermediate transmission elements 46. A control bar 55 carried by arm 56 mounted on a shaft 57 co-operates with slots 55a in the shutters 54 and is provided simultaneously to operate the shutters 54. In some instances, however, it is desired that only a predetermined section of the sensing mechanism be rendered effective during a sensing operation and to this end, in the present construction, there are provided selectively operable devices which include two field selecting shutters 58 and 59 each adapted to control the operation of a predetermined number of the shutters 54. The slots 55a permit the movement of the shutters 54 for one field while movement of the other shutters 54 is obstructed by their associated field selecting shutter 58 or 59 and spring-urged plungers 55b operate to cause the shutters 54 to follow the control bar 55 except when the shutters are prevented from moving by their field selecting shutter. The manner of selection of the shutters 58 and 59 will be described below and each is of a width such that when it is in a substantially horizontal position such as is the shutter 58 shown in Figure 1A it extends across the path of the shutters 54 associated therewith and the operation of which it is to control.

As an example of the association of the field selecting shutters 58, 59 with the shutters 54 it may be assumed that the record cards are of the well known 65 column kind and the field selecting shutter 58 is associated with the shutters 54 for card columns 1 to 40 while the field selecting shutter 59 is associated with the shutters 54 for card columns 41 to 65.

When a field selecting shutter is in a position such as is illustrated by the shutter 59 in Figure 1A the shutters 54 controlled thereby are prevented from moving to the right as viewed in Figure 1A thereby preventing the corresponding intermediate elements 46 from swinging in a counter-clockwise direction about their heads 47 under the action of springs 53. If, however, the field selecting shutter is in a position such as that indicated in Figure 1A for the shutter 58 then on movement of the shutters 54 associated therewith the intermediate elements 46 swing counter-clockwise, the action of these elements being the same as the action of the intermediate elements described in United Kingdom specification No. 401,012. Accordingly, if either the field selecting shutter 58 or 59 is in its lower position then the corresponding columns of intermediate elements 46 cannot operate and the corresponding section of the pin box is rendered ineffective.

When, however, a section of the pin box is permitted to be effective then any sensing pin 37 which has found a hole in the card being sensed will descend until its upper end is below the lower end of the intermediate elements 46 and the latter will swing into engagement with the sensing pin so that on the ensuing up stroke of the movable part of the pin box the sensing pin 37 will push the intermediate element 46 upwards and through the corresponding transmission rod 51 will operate a corresponding wire in a connection box 60. The transmission wires 61 of the connection box are arranged in known manner to control the printing head of the tabulator. The manner in which the transmission wires 61 operate to control the printing head is well-known in the art and it is therefore not considered necessary to enter into an explanation thereof herein. It may, however, be similar to that described in United Kingdom specification No. 454,857 or similar to that described in United States specification No. 2,290,827.

The settable mechanism according to the invention for selectively operating the card stops will now be described. The card stops 34 and 35 are respectively mounted on stems 62 and 63, Figure 2, and have their lower ends 64 and 65 guided in a cross bar 66 secured to the machine frame. The card stop 34 is urged to its down or ineffective position by a spring 67 and the card stop 35 is similarly urged to ineffective position by a spring 68. The card stops 34, 35 are arranged for independent operation, the card stop 35 being actuated by a cam 69 secured to the shaft 44 and the card stop 34 being operated by a similar cam, not shown, also mounted on the shaft 44 and disposed behind the cam 69 as viewed in Figure 2. The cam 69 co-operates with a roller 70 carried by a bracket 71 secured to the stem 63 and the cam controlling the card stop 34 co-operates with a similar roller which is carried on a bracket 72 pivoted at 73 to the stem 62. A spring 74 retains the bracket 72 in cam engaging position against a pin 75 extending laterally from the stem 62.

Below the card stops there is provided a unit which determines the operation of the card stops 34 and 35. In this unit there is provided two control shafts consisting of a first control shaft 76 and a second control shaft 77, both control shafts being driven from the main shaft 1 through a train of gears 78, 79, 80 and 81, see Figure 5. The gear train comprises a 2:1 reduction train so that each of the control shafts 76 and 77 is rotated at one half the angular velocity of the main shaft 1. The gears 80 and 81 are freely rotatable on their respective control shafts 77 and 76 and these shafts are arranged to be independently coupled to the main shaft by clutch devices as described below.

The gear 81 supports two pawls 82 and 83 which are pivoted thereto respectively at 84 and 85. From each of the pawls there extends a lateral pin 86, the pins being located in arcuate slots 87 formed in the gear 81 to be concentric with the axes of the pivots 84, 85 and the pawls are controlled by springs 88. Each pawl is provided with a nose 89 capable of engaging a shoulder 90 on a snail-cam shaped clutch member 91 fixed to the first control shaft 76. Normally the pawls 82 and 83 are tripped so that their noses 89 do not engage the shoulder 90 during rotation of the gear 81 the tripping being effected by a first trip device including a trip member 92 fixed on a trip spindle 93. When the unit is inoperative the trip member 92 occupies the position shown in Figure 5 so that the tooth 94 provided thereon is engaged by a tail 95 on a pawl. Each pawl has a tail 95 and on engagement of the tail with the tooth 94 the pawl is rotated about its pivot against the action of its spring 88 and is tripped so that its nose 89 is not engaged with the shoulder 90 of the clutch member 91. When, however, as will be described below, the trip member 92 is moved from its tripping position the first pawl to pass the tripping position will have its nose 89 engaged with the shoulder 90 so that the control shaft 76 is rotated with the gear 81 and is coupled to the main shaft 1. The control shaft 76, when coupled to the main shaft, is rotated once during two complete revolutions of the main shaft 1 and controls the operation of the card stops 34, 35 as will be described below.

The gear 80 also supports two pawls 82 and 83 and a clutch member 91 is also secured to the control shaft 77 so that this shaft also can be caused to rotate one cycle for two revolutions of the main shaft. The pawls on the gear 80, however, are controlled by a second trip device which includes a trip member 96 secured to a trip spindle 97. As will be described below the control shaft 77 is selectively rendered effective when interstage data positions are to be sensed.

Actuation of the control shafts is determined by control holes punched in the card being sensed in the sensing chamber formed by the plates 32, 33 and the control shafts are conditioned for operation during the first sensing cycle in which the card receives its first sensing. Thus if during the first sensing cycle a control hole is sensed indicating that the card is to remain in the same sensing position for a second sensing cycle the sensing pin 37 which passes through the control hole will operate its associated transmission wire 61 in the connection box to actuate a bell crank 98, Figure 1A, by rotating it counter-clockwise about its pivot 99. The pivot 99 comprises a pin supported by a bracket 100 fixed to the frame of the machine, and a spring 101 retains the bell crank in the position shown in Figure 1A. On counter-clockwise movement of the bell crank 98 a Bowden wire 102 is actuated and rocks an arm 103, Figures 1B and 5, secured to the trip spindle 93.

When actuated by the Bowden wire 102 the arm 103 is rocked clockwise against the action of a spring 264 thus causing the trip member 92 also to be rocked clockwise so that its tooth 94 is moved out of the path of the tail 95 of the pawl 82 or 83 which is at that time approaching the trip member 92. With the trip member moved out of its tripping position the pawl will not be tripped and its nose 89 will be engaged with the shoulder 90 of the clutch member 91 thus coupling the control shaft 76 to the main shaft 1.

Under control from the control shaft 76 there is provided latching means to retain a card stop 34, 35 in card locating position or to retain it in an ineffective position. The latching means includes a cam 104, Figure 4, on control shaft 76, the cam 104 engaging a roller 105, Figure 2, carried by a lever 106 pivoted at 107 to a block 108 secured to the machine frame. The lever 106 is urged counter-clockwise by a spring 263 so that its upper end is moved beneath the lower end 64 of the stem 62 supporting the card stop 34 thus preventing the downward movement of the card stop and thereby retaining the card located thereby in sensing position for a second sensing cycle.

Also secured to the control shaft 76 is a further cam 109, Figure 2, which engages a roller 110 carried on a second lever 111 pivoted at 112 to the block 108. The lever 111 is also controlled by the spring 263, being urged thereby in a clockwise direction so that its upper end is disposed beneath the lower end portion 65 of the stem 63 supporting the card stop 35. The timing of the cams 104 and 109 is such that they operate simultaneously to permit the levers 106, 111 to move inwards under the influence of the spring 263 or they act simultaneously to move the levers out of the paths of the lower ends 64, 65 of the stems 62, 63 carrying the stops 34, 35. The operation of the levers 106 and 111 will be described in more detail hereinafter together with other elements of the latching means for the card stops 34, 35.

The field selecting shutters 58 and 59 are also controlled from the control shaft 76 this being effected by two cams 113 and 114 secured to the control shaft 76, Figure 1B. The cam 113 is engaged by a roller supported by a bell crank 115 pivoted on a spindle 116 and having connected thereto a link 117 the upper end of which is connected to an arm 118, Figure 1A, mounted on a spindle 119 to which the field selecting shutter 58 is secured. The cam 114 co-operates with a roller carried by a second bell crank 120 also pivoted on the spindle 116 this bell crank being connected with one end of a link 121 the other end of which is connected with the shutter 59 which is freely mounted on the spindle 119. The cams 113 and 114 are so timed that when one of the shutters 58 or 59 is in its lower or effective position the other is in its upper of ineffective position.

The field selecting shutters 58 and 59 are, as described above, operated automatically from the control shaft 76 but for certain operations it is desired to be able manually to condition the shutters. To this end the shutter 58 has a tail piece 250 from which extends a lateral pin 251 engageable by a downwardly projecting plate 252 secured to a link 253 mounted for lengthwise movement under control of a spring 254. At one end of the link 253 there is provided a slot 255 in which is housed a pin 256 extending laterally from a lever 257 pivoted at 258 to a bracket 259 secured to the frame of the machine. The pin 256 retains the link 253 and lever 257 in desired relation and the slot 255 is provided to permit adjustment of the link relative to the lever.

The top of the bracket 259 is of arcuate form and is provided with two slots 260 and 261 in one or other of which can be located a spring controlled pin 262 supported by the lever 257. When the lever 257 is in the position shown in Figure 1A the link 253 is in its withdrawn position, that is, it has been moved fully to the right as viewed in Figure 1A so that the pin 251 is not engaged by the plate 252 and the field selecting shutter 58 is conditioned for control by the cam 114. With the lever 257 in the position just described the field selecting shutter 59 will be moved to its effective position during a second sensing cycle performed on a card which has been retained in sensing position as a result of the operation of the control shaft 76 and when the shutter 59 is effective only those shutters 54 which are controllable by the shutter 58 will be permitted to operate in the manner described above.

If, however, it is desired that the whole of a card be sensed during the first sensing cycle then the lever 257 is moved counter-clockwise until the pin 262 is registered in the slot 260 when the plate 252 will cause the field selecting shutter 58 to be raised so that during the first sensing cycle both the field selecting shutter 58 and the field selecting shutter 59 will be in the raised position with the result that all of the shutters 54 are free to operate and the whole of the card, either in normal positions or in interstage positions, is sensed in the one sensing operation.

Also on the control shaft 76 is a further cam 122, Figures 2 and 3, which is engaged by a follower carried on an arm 123 fixed to a spindle 124, the spindle 124 being urged in a clockwise direction by a further arm 125 secured thereto and a spring 126. The spindle 124 also has secured thereto a latch 127, Figure 5, having a tooth 128 which is normally located out of the path of the pawls 82, 83 carried by the gear 80. The purpose of the latch 127 is to act as a delay device to delay the coupling of the second control shaft 77 to the main shaft when the trip members 92, 96 are simultaneously operated as will be hereinafter described. The delay device thus ensures that the control shafts 76, 77 are coupled to the main shaft 1 in the desired timed relation.

The trip member 96 is also operated by a control hole punched in the card being sensed and is moved out of the path of the pawls 82, 83 carried by the gear 80 when, during the first sensing cycle in respect of a card this second control hole is sensed. When the appropriate sensing pin 37 passes through this last mentioned control hole it operates its associated transmission wire 61 and this wire actuates a second bell crank similar to the bell crank 98 described above. The said second bell crank is also mounted on the spindle 99 and is disposed behind the bell crank 98 as viewed in Figure 1A. Actuation of said second bell crank 98 operates a second Bowden wire 129 and the Bowden wire 129 rocks a swinging abutment 130, Figures 5 and 8, into engagement with a pin 131 extending laterally from an arm 132 secured to the trip spindle 97. The trip spindle 97 being thus rocked causes the trip member 96 to be moved out of the path of the pawls 82, 83 carried by the gear 80.

The swinging abutment 130 is pivoted at 133 to a plate 134 pivoted at 135 to the frame of the machine. One end of the plate 134 is in the form of a segment and is provided with three detents 136, 137 and 138 any one of which can co-operate with a pin 139 extending laterally from a lever 140 pivoted at 141 to the frame of the machine. A link 142 is connected to the plate 134 and to an arm 143 secured to a spindle 144 mounted in a bracket 145 secured to the machine frame. A further arm 146 is also secured to the spindle 144 and is connected to one end of a link 147 the other end of which is connected at 148 to one arm of a bell crank 149 which is pivoted at 150 to the frame of the machine. The other arm of the bell crank 149 has at its upper end an adjusting member 151, of known construction, which includes a pin 152 acting against a spring, not shown, the pin being adapted to be inserted into one or other of three slots 153, 154 and 155 formed in the top of the frame.

When the control unit is conditioned to operate on cards containing data punched only in normal data positions, the pin 152 of the adjusting member 151 is located in the slot 153 and the plate 134 occupies the position shown in Figure 8. In this position the swinging abutment 130 is raised so that the portion 130a cannot engage the pin 131 on the arm 132. If, however, the sensing pins 37 of the sensing mechanism are to sense data punched only in interstage data positions, the pin 152 is positioned in the slot 154 and the plate 134 is then moved so that the detent 137 is engaged by the pin 139. When the plate 134 is in this position the swinging abutment 130 is so disposed that the portion 130a is not engaged with the pin 131 on the arm 132 if the Bowden wire is actuated as a result of a control hole being sensed during a first sensing operation on a card.

When the sensing device is to operate so that data punched in normal data positions is sensed during a first sensing cycle and this cycle is to be followed by a sensing cycle during which data punched in interstage data positions is to be sensed as a result of the sensing of a control hole sensed during the first sensing cycle, the pin 152 is located in the slot 155 and the plate 134 is then moved to a position at which the detent 138 is engaged by the pin 139. When the plate 134 occupies this position the swinging abutment 130 is so positioned that the part 130a of the abutment can be engaged with the pin 131 on the arm 132 when the Bowden wire 129 is actuated.

Also on the first control shaft 76 is secured a cam 156, Figure 8, which co-operates with a roller 157 on a lever 158 pivoted at 159 to the machine frame. A similar cam 160 is secured to the second control shaft 77 and is engaged by a roller 161 on a lever 162 pivoted at 163 to the machine frame. The upper ends of the levers 158 and 162 are arranged respectively to engage pins 164 and 165 extending laterally from a bar 166 slidably mounted on pins 167 and 168 which are located in slots 169 and 170 formed in the bar 166. The bar 166 is urged to the left, as viewed in Figure 8, by a spring 171 and on actuation of either of the cams 156 or 160 the bar 166 is moved to the right as viewed in Figure 8.

A pin 172 extending laterally from the bar 166 is located in a slot 173 formed in a lever 174 secured to a spindle 175. To the upper end of the lever 174 is connected one end of a link 176 the other end of which is connected to a latch 177 having a notch 178 formed therein for engagement with a nose 179 extending laterally from an arm 180 secured to the magazine feed shaft 9. Thus each time the control shaft 76 or 77 is operated, thus indicating that a card is being retained in sensing position for a second sensing cycle, the bar 166 is moved to the right, as viewed in Figure 8, thereby causing the notch 178 in the latch 177 to be moved into the path of the nose 179 on the arm 180. When this occurs the shaft 9 is prevented from being rocked to effect the feeding of a further card from the magazine 10 although the eccentric 3 continues to function as it is driven from the main shaft 1. This is permitted due to the arm 8 being moved freely on the shaft 9 so that it does not engage the pin 14 to effect a rocking operation of the shaft 9.

Also mounted on the spindle 175 is a lever 181, Figure 2, which, when the spindle 175 is rocked as above described, has its upper end moved into position beneath the lower end of the stem carrying the card stop 18 for the pre-sensing mechanism above described. Thus, when the lever 181 is in position beneath the card stop 18 the latter is prevented from being lowered to release a card from the card chamber of the first sensing mechanism and consequently this card remains in the sensing chamber until the lever 181 is restored to the position shown in Figure 2.

When during the operation of the machine interstage data positions are to be sensed by the sensing pins 37 the card stop 34 is to be latched in its down or ineffective position and to this end there is provided on the control shaft 77 two cams 182 and 183, Figure 2, the cam 182 engaging a roller 184 carried by a lever 185 pivoted at 186, the upper end of the lever 185 being arranged to engage a pin 187 extending laterally from a plate 188 extending downwards from a slide 189, hereinafter referred to as a third slide, having integral therewith an upstanding abutment 190 which is movable beneath a projection shown as a plate 191 secured to the stem 63 of the card stop 35. The third slide 189 is guided for lengthwise movement by combs 192, 193 secured to the bars 20 and 66 respectively.

The cam 183 engages with a roller 197, Figures 3 and 4, mounted on an arm 198 also pivoted on the spindle 186. The upper end of the arm 198 engages a pin 199 on a depending plate 200 secured to a slide 201, hereinafter referred to as a second slide. The slide 201 is also guided for lengthwise movement by the combs 192 and 193. Integral with the second slide 201 and extending upwards therefrom is a latch 202 to engage a latch plate 203 secured to the stem 62 supporting the card stop 34.

A link 204, Figure 2, is connected at one end to the arm 198 and at its other end to an arm 205 secured to the spindle 141. Thus, although the operation of the second slide 201 is controllable by the cam 183 it is also controllable by the bell crank 149, links 147, 142 and plate 134 so that when the detent 137 on plate 134 is engaged by the pin 139 on lever 140 the arm 198 is rocked to the right, as viewed in Figure 2, and the second slide 201 is moved into latching position under the action of a spring 196.

A further slide 206, hereinafter referred to as a first slide, is mounted for lengthwise movement between the combs 192 and 193 and has a downwardly depending plate 207 and a pin 208 extending laterally therefrom. The pin 208 is engageable by the upper end of a lever 209 pivoted on the spindle 107 and the lever 209 carries a cam roller 210 which engages with a cam 211, Figures 3 and 4, on the control shaft 76. The first slide 206 also has an upstanding latch 266, Figure 4, similar to the latch 202 and is adapted, under control of cam 211, to be engaged with the latch plate 203.

When the control shafts 76 and 77 are idle they are retained in starting position by discs 212 and 213, Figure 7, secured respectively to the control shafts 76, 77, the discs 212, 213 respectively having pins 214, 215 extending laterally therefrom and engageable in V-shaped notches 216, 217 in detent levers 218, 219 each pivoted on a spindle 220. The levers 218, 219 are urged upwards to latching position by springs 221.

In order that the operation of the apparatus above described may be clearly understood the various functions which can be performed thereby will now be described.

Simultaneous sensing of all normal data indicating positions

When all normal data indicating positions on a card are to be simultaneously sensed in a single sensing cycle and no interstage sensing is required the card is not provided with a control hole indicating that the card is to be retained in normal sensing position for a second sensing cycle and when each of the cards fed to the machine is to be sensed once only the first control shaft 76 is not clutched to the main shaft 1 during the operation of the machine as in such circumstances the Bowden wire 102 is never actuated. The cards, or some of them, may however be punched in interstage positions and may be provided with a control hole to cause actuation of the Bowden wire 129. Since, however, the cards are not to be sensed in interstage positions the machine is conditioned to prevent the coupling of the control shaft 77 to the main shaft 1. To this end the bell crank 149 is set to the position shown in Figure 8 in which the pin 152 is located in the slot 153. The plate 134 is then positioned so that the pin 139 is housed in the detent 136 thereby raising the part 130a of the swinging abutment 130 out of the path of the pin 131 on the arm 132 so that even if the Bowden wire 129 should be actuated the arm 132 will not be rocked as a result thereof and consequently the second control shaft 77 will not be clutched to the main shaft 1.

Also before starting up the machine the lever 257 is positioned so that the pin 261 is located in the slot 260 thereby causing the field selecting shutter 58 to be raised to a position similar to that occupied in Figure 1A by the field selecting shutter 59. Thus, both the field selecting shutter 58 and the field selecting shutter 59 are retained in raised or ineffective position and during each sensing cycle all of the shutters 54 are effective.

When the machine is started up, a card is fed from the magazine 10 into the pre-sensing mechanism where it is arrested and located in the sensing chamber by the card stop 18, the stop being actuated by the cam 19 on the shaft 2.

After the pre-sensing operation is completed the cam 19 permits the stop 18 to be lowered so that the card is fed out of the pre-sensing chamber and into the second sensing chamber formed by the plates 32, 33 where it is arrested and located in the sensing chamber by the card stop 34 operated under control of its associated cam secured to the shaft 44. The card stop 35 will also be raised by its cam 69 on shaft 44 but as it is located behind the stop 34 it is ineffective and it is lowered together with the card stop 34 when the card has been sensed, the card then being fed out of the sensing chamber. It will be understood that, when the machine is conditioned to operate as just described, the card stop 35 although being actuated together with the card stop 34 is never effective to arrest a card in sensing position. Further, as each of the field selecting shutters 58, 59 is ineffective during the sensing cycle all of the normal data indicating positions of a card located in the sensing chamber by the card stop 34 are simultaneously sensed during a single sensing cycle and successive cards are sensed during successive sensing cycles.

*Simultaneous sensing of all interstage data indicating positions*

When all interstage data indicating positions on a card are to be sensed simultaneously in a single sensing cycle the card is not provided with a control hole indicating that the card is to be retained in interstage sensing position for a second sensing cycle and when each of the cards fed to the machine is to be sensed once only the first control shaft 76 is not clutched to the main shaft during the operation of the machine to cause the card to be retained in sensing position for a second sensing cycle.

As, however, only interstage data indicating positions are to be sensed the card stop 34 must be rendered ineffective at all times. To this end the bell crank 149 is positioned so that the pin 152 is located in the slot 154. In this position of the bell crank 149 the plate 134 is moved so that the detent 137 is engaged by the pin 139. The lever 140 is moved clockwise and rocks the arm 205 so that the link 204 is moved to the right, as viewed in Figure 2. The upper end of the lever 198 is moved by the link 204 out of engagement with the pin 199 depending from the second slide 201 so that the second slide is moved to the right, as viewed in Figure 2, under the action of its spring 196 and the latch 202 on the second slide is thus moved into position to be engaged with the latch plate 203 so that the stem 62 is latched in its down position. Thus although the cam for the card stop 34 is rotated together with the cam 69 on the shaft 44 the card stop 34 is not operated because, during each lifting movement of its associated cam, instead of the stem 62 being raised by the cam the bracket 72 will be turned about its pivot 73 against the action of spring 74 while the card stop 34 is retained in its ineffective position by the engagement of the latch 202 on the second slide 201 with the latch plate 203 on the stem 62.

It will therefore, be understood that when the machine is conditioned by the pin 152 on bell crank 149 being positioned in the slot 154 the card stop 34 is permanently ineffective and the card stop 35 is actuated during each cycle of the main shaft 1 to locate a card in interstage data sensing position and to release the card from the sensing chamber after a single sensing cycle.

As the whole of the interstage data positions are to be sensed simultaneously the lever 257 is moved to the position in which its pin 262 is located in the slot 260 so that the field selecting shutter 58 is rendered ineffective and is raised out of the path of its associated shutters 54. Accordingly, during each sensing cycle all of the shutters 54 are effective.

*Sensing normal data indicating positions in two card fields, the fields being sensed in successive cycles*

When cards are punched in normal data indicating positions and the data is contained in two fields each to be sensed during different sensing cycles, the first field to be sensed contains a control hole indicating that the card is to be retained in normal sensing position by the card stop 34 for a second sensing cycle.

The card may also contain interstage data in which event it may also be provided in the first sensed normal field with a control hole indicating that the second normal sensing cycle is to be followed by an interstage sensing cycle. Since, however, no interstage sensing is to be effected the machine is conditioned by moving the bell crank 149 to the position shown in Figure 8 so that the pin 152 is located in the slot 153. With bell cranks 149 in this position the pin 139 is located in the detent 136 in plate 134 and the swinging abutment 130 is moved to a position such that the part 130a will not engage with the pin 131 on the arm 132 on actuation of the Bowden wire 129. Thus although the Bowden wire 129 may be actuated during the operation of the machine the arm 132 is not rocked and accordingly the second control shaft 77 is not clutched to the main shaft 1 of the machine.

The machine is further conditioned by moving the lever 257 to the position shown in Figure 1A in which position of the lever the pin 262 is located in the slot 261. With the lever 257 in this position the plate 252 is moved out of engagement with the pin 251 on the tail piece 250 of the field selecting shutter 58 so that the shutter is conditioned for actuation under control from the first control shaft 76.

When the machine is set in operation a card is fed from the magazine 10 to the pre-sensing mechanism as described above, and after being sensed therein is fed into the second sensing mechanism where it is arrested and located in sensing position by the card stop 34. The movable part of the pin box containing the sensing pins 37 is then moved downwards to sense the first field of the card, the shutters 54 for the second field being controlled and rendered ineffective by the field selecting shutter 58 which is then in the position shown in Figure 1A. During the first sensing cycle a sensing pin 37 senses the control hole mentioned above and, through its associated transmission wire 61, operates the bell crank 98 which in turn actuates the Bowden wire 102 thus rocking the arm 103 in a clockwise direction and moving the trip member 92 out of the path of the tails 95 of the pawls 83, 84 carried by the gear 81. Thus, the nose 89 of one of the pawls is moved into engagement with the shoulder 90 of the clutch member 91 and the first control shaft 76 is clutched to the main shaft 1 to be rotated thereby, the pin 214 being moved out of the notch 216 in the detent lever 218.

The first control shaft 76 when clutched to the main shaft 1 is rotated at one-half the angular velocity of the main shaft and when it has completed one revolution, as the bell crank 98 is not again actuated during the next succeeding sensing cycle, the pin 214 is again located in the slot 216 formed in detent lever 218, the trip member 92 having been restored into the path of the tails 95 of the pawls 83, 84 by the spring 264.

As a result of the setting in operation of the first control shaft 76, the cams 104 and 109, Figure 4, permit levers 106 and 111 both to move inwards under the action of spring 263 so that their upper ends are respectively disposed beneath the lower ends 64 and 65 of the stems 62 and 63 which support the card stops 34 and 35 so that instead of being lowered after the first sensing operation is completed the card stops 34 and 35 are maintained in raised position and the stop 34 continues to locate the card in sensing position. The cam 211 operates the lever 209 so that the first slide 206 is moved to the right, as viewed in Figure 2, and the latch 266 carried thereby is moved to latching position. Since, however, the card stop 34 is retained in its upper position by the lever 106 the latch 266 does not become effective, the latch plate 203 being retained in position above the latch 266.

The cams 113 and 114, Figure 1B, on the first control shaft 76 become operative on rotation of this shaft and, after the first sensing operation is completed actuate the links 117 and 121 so that the field selecting shutter 59 is moved downwards to render ineffective its associated shutters 54 while the field selecting shutter 58 is raised by the link 121 so as to permit the shutters 54 associated therewith to become effective during the second sensing cycle. Thus, during the second sensing cycle the pins 37 are effective only over that card field which is controlled by shutters 54 and the field selecting shutter 58.

As the card is being retained in sensing position for a second sensing cycle, the card feed must be rendered ineffective otherwise a card will be fed from the magazine during the second sensing cycle and this, it will be understood, is not required. Accordingly the cam 156, Figure 8, on the first control shaft 76 operates the lever 158 which engages the pin 164 and thereby moves the bar 166 to the right as viewed in Figure 8. This movement of the bar 166 rocks the lever 174 together with the link 176 and thereby moves the latch 177 into latching engagement with the nose 179 thereby, as earlier described, preventing the feeding operation of the magazine feed tooth 11.

The actuation of lever 174 rocks the spindle 175 and moves the upper end of the lever 181 beneath the lower end of the stem carrying the card stop 18 of the pre-sensing mechanism thereby preventing the card stop 18 from being lowered. As the cam 19 is again rotated during the second sensing cycle, the roller 22 and arm 23 are raised about the pivot 24 against the action of spring 26 and the cam 19 is thus rendered ineffective during the second sensing cycle.

It will be understood that towards the end of the second sensing cycle the first control shaft 76 reaches a position at which the levers 106 and 111 are restored to their starting positions, and the links 117, 121 restore the field selecting shutters 58, 59 to their starting positions. The first slide 206 is restored so that the latch 266 is moved to its ineffective position, the latch 177 is again restored so that during the next machine cycle the magazine feed is permitted to feed a card from the magazine to the pre-sensing mechanism, and the lever 181 is also restored to its starting position as shown in Figure 2.

At the end of the revolution of the first control shaft 76 the pin 214 is again moved into engagement with its slot 216 in the detent lever 218 and the control shaft 76 is rendered ineffective. It will, however, be understood that the control shaft 76 will again be rendered effective during the first sensing operation performed on the next succeeding card if this card should contain the appropriate control hole for effecting actuation of the Bowden wire 102.

*Sensing interstage data indicating positions in two card fields, the fields being sensed in successive sensing cycles*

When cards are punched in interstage data indicating positions and the data is contained in two fields each to be sensed during different sensing cycles, the first field to be sensed contains a control hole indicating that the card is to be retained in interstage sensing position by the card stop 35 for a second sensing cycle.

Before setting the machine in operation it is conditioned by moving the bell crank 149 so that the pin 152 is located in the slot 154. In this position of the bell crank 149 the plate 134 is moved so that the detent 137 is engaged by the pin 139. The lever 140 is moved clockwise and rocks the arm 205 so that the link 204 is moved to the right, as viewed in Figure 2. The upper end of the lever 198 is moved by the link 204 out of engagement with the pin 199 depending from the second slide 201 so that the second slide is moved to the right, as viewed in Figure 2, under the action of its spring 196 and the latch 202 on the second slide is thus moved into a position to be engaged with the latching plate 203 so that the stem 62 is latched in its down position. Thus although the cam for the card stop 34 is rotated together with the cam 69 on the shaft 44 the card stop 34 is not operated because, during each lifting movement of its associated cam, instead of the stem 62 being raised by the cam the bracket 72 will be turned about its pivot 73 against the action of spring 74 while the card stop 34 is retained in its ineffective position by the engagement of the latch 202 on the second slide 201 with the latch plate 203 on the stem 62.

The machine is further conditioned by moving the lever 257 to the position shown in Figure 1A in which position of the lever the pin 262 is located in slot 261. With the lever 257 in this position the plate 252 is moved out of engagement with the pin 251 on the tailpiece 250 of the field selecting shutter 58 so that the shutter is conditioned for actuation under control from the first control shaft 76.

When the machine is set in operation a card is fed from the magazine 10 to the pre-sensing mechanism, as described above, and after being sensed therein is fed into the second sensing mechanism where it is arrested and located in sensing position by the card stop 35. The movable part of the pin box containing the sensing pins 37 is then moved downwards to sense the first field of the card, the shutters 54 for the second field being controlled and rendered ineffective by the field selecting shutter 58 which is then in the position shown in Figure 1A. During the first sensing cycle a sensing pin 37 senses the control hole mentioned above and, through its associated transmission wire 61, operates the bell crank 98 which in turn actuates the Bowden wire 102 thus rocking the arm 103 and moving the trip member 92 out of the path of the tails 95 of the pawls 83, 84 carried by the gear 81. Thus the nose 89 of one of the pawls is moved into engagement with the shoulder 90 of the clutch member 91 and the first control shaft 76 is clutched to the main shaft 1 to be rotated thereby, the pin 214 being moved out of the notch 216 in the detent lever 218.

The first control shaft 76 when clutched to the main shaft 1 is rotated at one-half the angular velocity of the main shaft and when it has completed one revolution, as the bell crank 98 is not again actuated during the next succeeding sensing cycle, the pin 214 is again located in the slot 216 formed in detent lever 218, the trip member 92 having been restored into the path of the tails 95 of the pawls 83, 84 by the spring 264.

As a result of the setting in operation of the first control shaft 76, the cams 104 and 109, Figure 4, permit levers 106 and 111 both to move inwards under the action of spring 263. The upper end of lever 111 is then disposed beneath the lower end 65 of the stem 63 supporting the card stop 35 so that instead of being lowered after the first sensing operation the card stop 35 is retained in raised position and continues to locate the card in sensing position.

The card stop 34, however, is latched in its down or ineffective position by the latch 202 on the second slide 201 and the inward movement of the lever 106 is arrested by the upper end of the lever abutting against the lower end 64 of the stem 62 supporting the card stop 34. To accommodate this arresting of the lever 106 the spring 263 stretches.

The cams 113 and 114, Figure 1B, on the first control shaft 76 become operative on rotation of this shaft and after the first sensing operation is completed actuate the links 117 and 121 so that the field selecting shutter 58 is moved upwards to render effective its associated shutters 54 while the field selecting shutter 59 is lowered by the link 121 so as to permit the shutters 54 associated therewith to become ineffective during the second sensing cycle. Thus, during the second sensing cycle the pins 37 are effective only over that card field which is controlled by shutters 54 and the field selecting shutter 58.

As the card is being retained in sensing position for a second sensing cycle, the card feed must be rendered ineffective otherwise a card will be fed from the magazine during the second sensing cycle and this, it will be understood, is not required. Accordingly the cam 156, Figure 8, on the first control shaft 76 operates the lever 158 which engages the pin 164 and thereby moves the bar 166 to the right as viewed in Figure 7. This movement of the bar 166 rocks the bar 174 together with the link 176 and thereby moves the latch 177 into latching engagement with the nose 179 thereby, as earlier described, preventing the feeding operation of the magazine feed tooth 11.

The actuation of lever 174 rocks the spindle 175 and moves the upper end of the lever beneath the lower end of the stem carrying the card stop 18 of the pre-sensing mechanism thereby preventing the card stop 18 from being lowered. As the cam 19 is again rotated during the second sensing cycle, the roller 22 and arm 23 are raised about the pivot 24 against the action of spring 26 and the cam 19 is thus rendered ineffective during the second sensing cycle.

It will be understood that towards the end of the second sensing cycle the first control shaft 76 reaches a position at which the levers 106 and 111 are restored to their starting positions, and the links 117, 121 restore the field selecting shutters 58, 59 to their starting position. The first slide 206 is restored so that the latch 266 is moved to its ineffective position but since the latch plate 203 is engaged by the latch 202 on the second slide 201 the card stop 34 remains latched in ineffective position.

The latch 177 is also again restored so that during the next machine cycle the magazine feed is permitted to feed a card from the magazine to the pre-sensing mechanism, and the lever 181 is also restored to starting position as shown in Figure 2.

At the end of the revolution of the first control shaft 76 the pin 214 is again moved into engagement with its slot 216 in the detent lever 218 and the control shaft 76 is rendered ineffective. It will, however, be understood that the control shaft 76 will be rendered effective during the first sensing operation performed on the next succeeding card if this card should contain the appropriate control hole for effecting actuation of the Bowden wire 102.

*Simultaneous sensing of all normal data positions followed by simultaneous sensing of all interstage data positions in the same card.*

For this method of operation the machine is conditioned by moving the bell crank 149 so that the pin 152 is located in the slot 155. With the bell crank in this position the plate 134 is moved thereby so that the pin 139 is located in the detent 138. This causes the part 130a of the swinging abutment 130 to be positioned for engagement with the pin 131 on the arm 132 so that when the Bowden wire 129 is actuated it causes the arm 132 to be rocked as described below.

As during the sensing of the normal and interstage data positions the whole of such positions are to be sensed simultaneously the machine is further conditioned by moving the lever 257 so that the pin 262 is located in the slot 260. The field selecting shutter 58 is thus raised out of the path of its associated shutters 54 so that during each sensing cycle the whole of the data positions, either normal positions or interstage positions, are sensed simultaneously as has been previously described.

The card which is to be twice sensed, first in normal positions and then in interstage positions, is provided with a control hole in the normal field. This control hole during the sensing of the normal data positions is sensed by a sensing pin 37 which passes therethrough and operates the transmission wire 61 associated therewith to rock the bell crank 98 which actuates the Bowden wire 129. Actuation of the Bowden wire 129 rocks the part 130a of the swinging abutment 130 into engagement with the pin 131 and arm 132 thereby rocking the spindle 97 so that the trip member 96 is moved clockwise out of the path of the tails 95 provided on the pawls carried by the gear 80 thus freeing the pawls so that one of them engages the clutch member 91 on the shaft 97 and clutches the second control shaft 77 to the main shaft 1.

When the card is fed into the sensing chamber formed by the plates 32, 33 it is first located in the sensing chamber by the card stop 34 which at this time together with the card stop 35 is raised to the position shown in Figure 2 under control of the cams on shaft 44. While the card is located in sensing position by the card stop 34 the movable part of the pin box is lowered to sense the normal data positions in the card and is thereafter again raised as has been previously described. As has just been described above, however, during this sensing operation a control hole was sensed with the result that the Bowden wire 129 was actuated and the second control shaft 77 becomes clutched to the main shaft 1 towards the end of the sensing cycle during which the normal data positions are sensed.

On rotation of the second control shaft 77 the cams 182 and 183 rock the levers 185 and 198 clockwise so that the third slide 189 and the second slide 201 are moved to the right as viewed in Figure 2. This occurs before the cams on shaft 44 operate to permit the lowering of the card stops 34 and 35 and the movement of the third slide 189 causes the upstanding abutment 190 to be moved beneath the plate 191 so that the card stop 35 is supported thereby in its raised position. The operation of the second slide 201, however, moves the latch 202 carried thereby to the right so that when the card stop 34 is lowered the latch plate 203 carried on the stem 62 is moved past the latch 202 and is held in latched position thereby. The downward movement of the card stop 34 permits the card in the sensing chamber to be moved forwardly until it is arrested and located in sensing position by the raised card stop 35 so that during the next sensing operation the sensing pins 37 sense all of the interstage data positions in the card.

Also on the second control shaft 77 is the cam 160 and this operates during the first sensing cycle to move the lever 162 clockwise thereby effecting movement of the bar 166 to the right, as viewed in Figure 8, so that the link 176 is operated to move the latch 177 into latching engagement with the nose 179 on the arm 180 secured to the magazine feed shaft. This, as described above, prevents the feeding of a card from the magazine 10 during the second sensing cycle. The actuation of the bar 166 also, through lever 174, rocks spindle 175 and the lever 181 secured thereto so that the upper end of the lever 181 is positioned beneath the lower end of the stem supporting the card stop 18 for the pre-sensing mechanism so that the card stop 18 is retained in its effective position for a second cycle.

*Sensing of normal data positions in two sensing operations followed by sensing of interstage data positions in two sensing operations*

The card containing two fields each having normal data positions and two fields each having interstage data positions is provided in the first sensed normal field with a control hole which indicates that the card is to be retained in normal sensing position for a second sensing cycle. The first normal field also contains a control hole which indicates that the second sensing cycle is to be followed by an interstage sensing cycle. The first interstage field to be sensed contains a control hole which indicates that a second interstage sensing cycle is required.

The machine is conditioned by moving the bell crank 149 so that the pin 152 is located in the slot 155 thereby operating the links 147, 142 to move the plate 134 about its pivot 135 so that the pin 139 is located in the detent 138 to position the part 130a of the swinging abutment 130 for engagement with the pin 131 on arm 132 when Bowden wire 129 is actuated.

The lever 257 is positioned so that the pin 262 is located in the slot 261 and the field selecting shutter 58 is moved to the position shown in Figure 1A to render ineffective the slides 54 associated therewith.

When the card is fed into the sensing chamber formed by the plates 32 and 33 it is arrested by the card stop 34 which, together with the card stop 35, at this time is under control of the cams on shaft 44 and the two card stops are in the raised position as indicated in Figure 2. During the first sensing cycle the card field corresponding to the columns controlled by the field selecting shutter 59 is sensed by the sensing pins 37 associated with that field and the appropriate one of these pins detects the presence of the control hole in this field calling for a second cycle during which the card remains located in sensing position by the stop 34 and the second normal field is sensed. Detection of the control hole causes actuation of the appropriate transmission wire 61 which rocks the bell crank lever 98 and actuates the Bowden wire 102 associated therewith. Actuation of the Bowden wire 102 rocks the arm 103 and moves the trip member 92 out of the path of the tails 95 on the pawls 83, 84 supported by the gear 81. Thus, the first pawl to approach the shoulder 90 formed on the clutch member 91 after the trip member 92 has been rendered ineffective engages with the shoulder 90 and clutches the first control shaft 76 to the main shaft 1. The first control shaft 76 is thus set in motion during the first sensing cycle and before the end of the first sensing cycle the cams 104, 109 permit the levers 106, 111 to be moved inwards by the spring 263 so that the upper ends of the levers are moved respectively beneath the lower end portions 64 and 65 of the stems 62, 63 supporting the card stops 34, 35. The levers 106, 111 retain the card stops 34 and 35 in their raised position until the second normal field has been sensed during the second sensing operation.

Prior to the movable part of the sensing box being lowered for the second sensing operation, however, the cams 113, 114, Figure 1B, acting through levers 115, 120 actuate links 117, 121 so that the field selecting shutter 59 is moved to its lower position to render ineffective its associated slides 54, and the field selecting shutter 58 is raised out of the path of its associated shutters 54 thus rendering the latter effective.

Also before the second sensing operation the cam 156 on the first control shaft 76 rocks the lever 158 clockwise thereby moving the bar 166 to the right, as viewed in Figure 8, and through link 176 causing the latch 178 to be engaged with the nose 179 on arm 180 to render ineffective the magazine feed. As has been previously described, movement of the bar 166 also rocks the spindle 175 and moves the upper end of the lever 131 into position beneath the lower end of the stem for the card stop 18 so that the latter is retained in the raised position.

During the second sensing cycle the cam 211 on the first control shaft 76 rocks the lever 208 clockwise so that the first slide 206 associated therewith is moved to the right, as viewed in Figure 2, and the upstanding latch 266 carried thereby is moved into position to be engaged by the latch plate 203 when the stem 62 supporting the card stop 34 is lowered.

During the first sensing operation the control hole in the first normal field is sensed to indicate that the second sensing cycle is to be followed by a sensing cycle in an interstage position. Accordingly when the appropriate sensing pin passes through the control hole in the first sensed normal field it actuates its corresponding transmission wire 61 which, in turn, rocks its bell crank 98 to actuate the Bowden wire 129. The Bowden wire 129 engages the swinging abutment 130 and effects clockwise movement of the arm 132 thereby rocking shaft 97 and causing the trip member 96 to be moved out of the path of the tails 95 on the pawls 83, 84 carried by the gear 80. The release of the trip member 96 is effected before the end of the first sensing cycle and it is, therefore, in order to maintain the timing of the apparatus, necessary to provide a delay device to delay the engagement of a pawl with the clutch member 91 secured to the second control shaft 77.

The delay member comprises the latch 127, described above, and this latch is retained in the position shown in Figure 5 until just before the end of the first sensing cycle when the cam 122 on the first control shaft 76 rocks the arm 123 and shaft 124 to which the latch 127 is secured, thereby lowering the latch and moving into the path of the tails 95 of the pawls carried by the gear 80. Due to this arrangement when the pawls are released by the trip member 96, the first pawl so released is not engaged with the clutch member 91 on the second control shaft 77 as the tail 95 of that pawl is engaged by the shoulder 128 on latch 127 and is tripped so that it rides over the member 91. Before the next pawl passes the trip member 96, however, the latch 127 has been raised so that the second pawl becomes engaged with the member 191 and so clutches the second control shaft 77 to the main shaft 1.

Towards the end of the second sensing cycle the first control shaft 76 is arrested by its pin 214 and detent lever 218 and the levers 106, 111 and 209 are restored to their starting positions, as indicated in Figure 2. The timing of the cam 211, however, is synchronised with that of the cams 182, 183 on the second control shaft 77 so that before the latch 266 carried by the first slide 206 is restored to its normal position, the lever 198 is operated by the cam 183 to permit the second slide 201 to be moved to the right so that the latch 202 carried thereby is moved into latching engagement with the latch plate 203 on the stem 62 supporting the card stop 34. The cam 182 has also operated the lever 185 so that the third slide 189 moves the upstanding abutment 190 into position beneath the plate 191 thereby retaining the card stop 35 in its raised position while the card stop 34 is lowered and is latched in its lower or ineffective position. Thus, the card in the sensing chamber is advanced until it is arrested by the card stop 35.

During the third sensing cycle, which is the first sensing cycle for interstage data positions the card field controlled by the field selecting shutter 59 is sensed and in this field, as has been stated above, there is a control hole calling for a second sensing of interstage data positions. Accordingly when this control hole is sensed the Bowden wire 102 is again actuated and permits the first control shaft 76 again to be clutched to the main shaft 1 as above described.

During the third sensing cycle, the cam 169 on the second control shaft 77 rocks lever 162 so that the bar 166 is retained in the position to which it has been moved to the right, as viewed in Figure 8, to retain the latch 177 in engagement with the nose 179 thereby rendering the card feed ineffective. The spindle 175 is also again rocked to retain the lever 181 in position beneath the lower end of the stem supporting the card stop 18.

As the first control shaft 76 has again been set in operation, the cams 104, 109 are moved to permit the inward movement of the levers 106, 111 under the influence of the spring 263 but, as the card stop 34 is in its lower position, the lever 106 is engaged by the lower end 64 of the stem 62 and is prevented from being moved beneath the end of the stem. The upper end of the lever 111, however, is moved into position below the lower end 65 of the stem 63 supporting the card stop 35. When the cams 182, 183 on the second control shaft 77 again permit the levers 185, 198 to move counter-clockwise to restore the second and third slides 189 and 201, the card stop 34 is retained in its lower position by the latch 266, on the first slide 206, which has again been moved into latching position with the plate 203 by the actuation of the lever 209 by its cam 211.

The lever 111 retains the card stop 35 in raised position and accordingly the card remains located in the sensing chamber by the card stop 35 during a fourth sensing cycle, which is the second interstage sensing cycle.

Towards the end of the third sensing cycle the second control shaft 77 is again arrested by its pin 215 and the detent lever 219 but the card magazine remains rendered ineffective during the fourth sensing cycle because, due to the first control shaft 76 having again been set in operation, the cam 156 thereon has again been moved into position to retain the bar 166 in the position to which it is moved to the right, as viewed in Figure 8, to effect latching of the arm 180 by the latch 177. Also it will be understood that the card stop 18 is retained in its raised position during the fourth sensing cycle by the uppermost end of the lever 181 remaining in position beneath the lower end of the stem supporting the card stop 18.

From the foregoing it will be understood that by the provision of the settable control shafts 76 and 77, which are operated in timed relation with the sensing means, the sensing mechanism can be conditioned to perform varying sequences of sensing operations. The operations which have been described above have been each described as applicable to a single card. If desired, however, the cards fed from a pack in the magazine 10 need not all be cards requiring sensing in both normal data positions and interstage data positions. The machine will function continuously with mixed cards, always provided that the control holes are positioned in the correct location to operate the appropriate control shaft.

Further, it is to be understood that although in the foregoing description the apparatus according to the present invention has been described with reference to its application to a tabulating machine the apparatus may readily be adapted for incorporation in other forms of card controlled statistical machines.

I claim:

1. A statistical machine comprising in combination record card sensing means, card engaging elements respectively to locate a record card relative to said sensing means in positions at which during different sensing cycles normal or interstage data representations on a card can be sensed, and settable means operable under control from the sensing means to determine the number of sensing cycles during which each card engaging element is rendered effective to locate a card in sensing position.

2. A statistical machine according to claim 1, including selectively operable devices actuated under control from the sensing means to render different predetermined sections of the sensing means effective successively during successive sensing operations on a card while in the same sensing position.

3. A statistical machine according to claim 2, including selector means to condition said settable means for operation, said selector means being manually adjustable into one or another setting wherein the settable means operable for locating a card in position for sensing of interstage data representations is dissociated from control by the sensing means, said selector means when in said settings selectively disabling one or the other of said card engaging elements.

4. A machine according to claim 1 and in which the sensing means is driven from the main shaft of the machine, wherein said settable means comprises a control shaft, a clutch device to couple the control shaft to the main shaft, reduction gearing to transmit rotary motion from the main shaft to the control shaft so that the control shaft is rotated once for a predetermined number of rotations of the main shaft, a trip device to render the clutch device effective to couple the control shaft to the main shaft, said trip device being arranged for actuation by an impulse emitted from the sensing means when a predetermined control indication is detected in a card being sensed, cams on the control shaft, and latching means operable by said cams to control the card engaging elements.

5. A machine according to claim 1 and in which the sensing means is driven from the main shaft of the machine, wherein said settable means comprises a first control shaft and a second control shaft, a clutch device for each control shaft whereby the control shafts can be independently coupled to the main shaft, reduction gearing to transmit rotary motion from the main shaft to the control shafts so that the control shafts are rotated once for a predetermined number of rotations of the main shaft, a first trip device to render the clutch device for the first control shaft effective to couple the first control shaft to the main shaft, a second trip device to render the clutch device for the second control shaft effective to couple the second control shaft to the main shaft, said trip devices being arranged for actuation by impulses emitted from the sensing means when predetermined control indicia are detected in a card being sensed, cams on the first and second control shafts, and latching means operable by said cams to control the card engaging elements.

6. A machine according to claim 5, wherein the latching means comprises a pair of levers pivoted one on each side of said first control shaft and spring-urged towards each other to be aligned one beneath each card stop to retain the stops in card locating position, and a first slide movable under control of one of said cams and having associated therewith a latch for engagement with a latch plate carried by the card stop for locating a card in position to permit the sensing of normal data positions in a record card, said latch when engaged with the latch plate being arranged to retain the card stop in ineffective position.

7. A machine according to claim 6, wherein a second and a third slide are movable under control of cams on said second control shaft, the second slide having a latch associated therewith for engagement with said latch plate to retain the card stop associated therewith in an ineffective position and said third slide having an abutment to be engaged beneath a projection carried by the card stop for locating a card in position to permit the sensing of interstage data positions, said abutment when engaged beneath said projection being arranged to retain the card stop associated therewith in its effective position.

8. A machine according to claim 7, wherein a delay device operated by a cam on the first control shaft is arranged to delay the coupling of the second control shaft to the main shaft when the trip devices are simultaneously actuated, whereby the first and second control shafts are coupled to the main shaft for rotation in timed relation one with the other.

9. In a statistical machine of the class described, record card sensing means, card engaging elements to locate a record card relative to said sensing means in positions respectively at which during succeeding sensing cycles normal or interstage data representations on a card can be sensed, selectively operable means actuated under control from the sensing means to render a predetermined section of the sensing means effective during a sensing operation, and settable means operable under control from the sensing means to determine which card engaging element is to be rendered effective to locate a card in sensing position during the succeeding sensing cycle.

10. In a statistical machine of the class described, record card sensing means, card engaging elements to locate a record card relative to said sensing means in positions respectively at which during succeeding sensing cycles normal or interstage data representations on a card can be sensed, settable means operable under control from the sensing means to determine which card engaging element is to be rendered effective to locate a card in sensing position during the succeeding sensing cycle, and selector means for conditioning said settable means to render only the same one of said card engaging elements effective during a succeeding sensing cycle.

11. In a statistical machine of the class described, record card sensing means, card engaging elements to locate a record card relative to said sensing means in positions respectively at which during succeeding sensing cycles normal or interstage data representations on a card can be sensed, selectively operable devices actuated under control from the sensing means to render a predetermined section of the sensing means effective during a sensing operation, settable means operable under control from the sensing means to determine which card engaging element is to be rendered effective to locate a card in sensing position during the succeeding sensing cycle, and selector means for conditioning said settable means to render only the same one of said card engaging elements effective during a succeeding sensing cycle.

12. In a machine of the class described, controlled by record cards having data recorded therein in normal index positions and interstage index positions, card feeding and sensing means, said sensing means including a sensing element for each normal index position, a first card stopping member cyclically operable for locating a card in normal sensing relation to said sensing means, a second cyclically operable card stopping member effective during the disablement of said first stopping member for locating a card in interstage sensing relation to said sensing means, field selecting means associated with said sensing means and including members operable for rendering different predetermined sections of said sensing means ineffective during succeeding sensing operations, a normally inactive control member said member, when activated, rendering said field selecting means effective, latching means engageable with each of said stopping members and actuable by said control member, said latching means rendering effective for a succeeding sensing operation the card stopping member in effective position when the control member is activated, and means settable by said sensing means upon the detection of a predetermined control position of the card being sensed for activating said control member whereby said card is retained in the same normal or interstage sensing relation to said sensing means for a succeeding sensing operation.

13. In a machine of the class described, controlled by record cards having data recorded therein in normal index positions and interstage index positions, card feeding and sensing means, said sensing means including a sensing element for each normal index position, a first card stopping member cyclically operable for locating a card in normal sensing relation to said sensing means, a second cyclically operable card stopping member effective during the disablement of said first stopping member for locating a card in interstage sensing relation to said sensing means, field selecting means associated with said sensing means and including members operable for rendering different predetermined sections of said sensing means ineffective during succeeding sensing operations, a normally inactive first control member said member, when activated, rendering said field selecting means effective, latching means for each of said card stopping members, said latching means being actuated by said first control member to render effective for a succeeding sensing operation the stopping member in effective position when said first control member is activated, a normally inactive second control member, further latching means operable by said second control member, said further latching means including members for rendering said first stopping member ineffective and said second stopping member effective during a succeeding sensing operation, and means settable by said sensing means upon detecting predetermined control positions of the card being sensed for selectively activating said control members whereby said card is retained in either normal or interstage sensing relation to said sensing means for a succeeding sensing operation.

14. In a machine of the class described, controlled by record cards having data recorded therein in normal index positions and interstage index positions, card feeding and sensing means, said sensing means including a sensing element for each normal index position, a first card stopping member cyclically operable for locating a card in normal sensing relation to said sensing means, a second cyclically operable card stopping member effective during the disablement of said first stopping member for locating a card in interstage sensing relation to said sensing means, field selecting means associated with said sensing means and including members operable for rendering different predetermined sections of said sensing means ineffective during succeeding sensing operations, a normally inactive first control member said member, when activated, rendering said field selecting means effective, latching means for said card stopping members, said latching means being actuable by said first control member to render effective for a succeeding sensing operation the stopping member in effective position when said control member is activated, a normally inactive second control member, additional latching means operated by said second control member, said additional latching means including means for rendering said first stopping member ineffective and said second stopping member effective during a succeeding sensing operation, separate means settable by said sensing means upon sensing of separate predetermined control designations for selectively activating said control members, and means operated by said first control member for delaying the activation of said second control member, said delaying means operating upon the simultaneous setting of said separate control member activating means for rendering said second control member effective during the sensing operation following the last sensing operation controlled by said first control member.

15. In a machine of the class described, controlled by record cards having data recorded therein in normal index positions and interstage index positions, card feeding and sensing means, said sensing means including a sensing element for each normal index position, a first card stopping member cyclically operable for locating a card in normal sensing relation to said sensing means, a second cyclically operable card stopping member effective during the disablement of said first stopping member for locating a card in interstage sensing relation to said sensing means, field selecting means associated with said sensing means and including members operable for rendering different predetermined sections of said sensing means ineffective during succeeding sensing operations, a normally inactive first control member said member, when activated, rendering said field selecting means effective, latching means for each of said card stopping members, said latching means being actuated by said first control member to render effective for a succeeding sensing operation the stopping member in effective position when said first control member is activated, a normally inactive second control member, further latching means operable by said second control member, said further latching means including members for rendering said first stopping member ineffective and said second stopping member effective during a succeeding sensing operation, and means settable by said sensing means upon detecting predetermined control positions of the card being sensed for selectively activating said control members, and a manually settable selector member for conditioning the operation of said control members, said selector member engaging said activating means for said second control member and effective in one manual setting thereof for dissociating said activating means from the control of said sensing means whereby each card is retained in only normal sensing relation to said sensing means for one or more sensing operations.

16. In a machine of the class described, controlled by record cards having data recorded therein in normal index positions and interstage index positions, card feeding and sensing means, said sensing means including a sensing element for each normal index position, a first card stopping member cyclically operable for locating a card in normal sensing relation to said sensing means, a second cyclically operable card stopping member effective during the disablement of said first stopping member for locating a card in interstage sensing relation to said sensing means, field selecting means associated with said sensing means and including members operable for rendering different predetermined sections of said sensing means ineffective during succeeding sensing operations, a normally inactive first control member said member, when activated, rendering said field selecting means effective, latching means for each of said card stopping members, said latching means being actuated by said first control member to render effective for a succeeding sensing operation the stopping member in effective position when said first control member is activated, a normally inactive second control member, further latching means operable by said second control member, said further latching means including members for rendering said first stopping member ineffective and said second stopping member effective during a succeeding sensing operation, means settable by said sensing means upon detecting predetermined control positions of the card being sensed for selectively activating said control members, and a selector member manually settable for conditioning the operation of said control members, said selector member being operatively connected with the latching means for said first card stopping member and with the activating means for said second control member, said selector member being effective in one setting thereof for disabling said first card stopping member and dissociating said activating means for said second control member from control by said sensing means whereby each card is retained in only interstage relation to said sensing means for one or more sensing operations.

17. In a machine of the class described, operable under control of record cards having data recorded therein in both normal and interstage data designated positions, a reciprocable sensing mechanism, means for feeding records to said sensing mechanisms, said feeding means normally operating to feed a record for each operation of said sensing mechanism, separate card stopping means including a normal card stop for maintaining a record in normal sensing relation to said sensing mechanism and an interstage card stop for maintaining a record in interstage sensing relation to said sensing mechanism, a field selection device cooperating with said sensing mechanism, said device when operated selectively enabling different predetermined sections of said sensing mechanism in successive sensing operations, latching means engageable with each of said separate stopping means and selectively actuable for enabling and disabling a selected one of said stopping means, and a normally inoperative control means for selectively actuating said latching means and disabling said feeding means, said control means including separate control members independently activated by said sensing mechanism upon the sensing of separate control designations in a record, one of said control members when activated, operating said field selecting device, said one control member also actuating said latching means to maintain effective for a succeeding sensing operation the stopping member effective in the sensing operation when said control member is activated, the other control member actuating said latching means to render a different one of said stopping members effective in the succeeding sensing operation.

18. In a machine of the class described, controlled by record cards having data recorded in both normal and interstage index positions, a reciprocating sensing mechanism, means for feeding records to said sensing mechanism, cyclically operable card stopping means for arresting the feed of said cards in different sensing positions with relation to said sensing mechanism and including a first stop engaging a card in position for a normal sensing operation and a second stop engaging a card in position for an interstage sensing operation, means operable upon successive sensing operations of a card in the same sensing position for selectively disabling in succession predetermined sections of said sensing mechanism, latching means actuable for modifying the normal operation of said card stopping means, and control means for selectively actuating said latching means, said control means including a control member activated by said sensing means upon sensing a predetermined control designation, said control member rendering effective for a succeeding cycle said first stopping member when said control designation is sensed during a normal sensing operation, said control member rendering effective for a succeeding cycle said second stopping member when said control designation is sensed during an interstage sensing operation.

19. In a machine of the class described, controlled by record cards having data recorded in both normal and interstage index positions, a reciprocating sensing mechanism, means for feeding records to said sensing mechanism, cyclically operable card stopping means for arresting the feed of said cards in different sensing positions with relation to said sensing mechanism and including a first stop engaging a card in position for a normal sensing operation and a second stop engaging a card in position for an interstage sensing operation, means operable upon successive sensing operations of a card in the same sensing position for selectively disabling in succession predetermined sections of said sensing mechanism, latching means actuable for modifying the normal operation of said card stopping means, and control means for selectively actuating said latching means, said control means including a first control member activated by said sensing mechanism upon the sensing of a predetermined control designation during either a normal sensing operation or an interstage sensing operation, said first control member rendering effective for a succeeding sensing operation said first card stopping member when said control designation is sensed during a normal sensing operation, said first control member rendering effective for a succeeding sensing operation said second stopping member when said control designation is sensed during an interstage sensing operation, said control means also including a second control member activated by said sensing mechanism upon the sensing of a different predetermined control designation during a normal sensing operation, said second control member when activated rendering said first stopping member ineffective and said second stopping member effective for a succeeding sensing operation.

20. In a machine of the class described, controlled by record cards having data recorded in both normal and interstage index positions, a reciprocating sensing mechanism, means for feeding records to said sensing mechanism, cyclically operable card stopping means for arresting the feed of said cards in different sensing positions with relation to said sensing mechanism and including a first stop engaging a card in position for a normal sensing operation and a second stop engaging a card in position for an interstage sensing operation, means operable upon successive sensing operations of a card in the same sensing position for selectively disabling in succession predetermined sections of said sensing mechanism, latching means actuable for modifying the normal operation of said card stopping means, and control means for selectively actuating said latching means, said control means including a first control member activated by said sensing mechanism upon the sensing of a predetermined control designation during either a normal sensing operation or an interstage sensing operation, said first control member rendering effective for a succeeding sensing operation said first card stopping member when said control designation is sensed during a normal sensing operation, said first control member rendering effective for a succeeding sensing operation said second stopping member when said control designation is sensed during an interstage sensing operation, said control means also including a second control member activated by said sensing mechanism upon the sensing of a different predetermined control designation during a normal sensing operation, said second control member when activated rendering said first stopping member ineffective and said second stopping member effective for a succeeding sensing operation, said control means also including delaying means operated by said first control member for preventing the simultaneous activation of said second control member, said delaying means rendering said second control member effective during the sensing operation succeeding the last sensing operation controlled by said first control member.

CHARLES THOMAS ARTHUR JONES.

References Cited in the file of this patent

UNITED STATES PATENTS

| Number | Name | Date |
|---|---|---|
| 2,324,438 | Thomas et al. | July 13, 1943 |